United States Patent [19]

Barnett

[11] 3,802,978
[45] Apr. 9, 1974

[54] METHOD AND APPARATUS FOR TIRE TREAD BONDING

[75] Inventor: Ernest Eugene Barnett, Salem, Va.

[73] Assignee: Brad Ragan, Inc., Spruce Pine, N.C.

[22] Filed: Feb. 7, 1972

[21] Appl. No.: 224,003

[52] U.S. Cl................ 156/96, 156/128, 156/285, 156/7, 156/394 FM
[51] Int. Cl........................ B29h 5/04, B29h 17/36
[58] Field of Search........ 156/128, 394, 394 FM, 96, 156/285, 287; 264/36, 315, 316; 425/19, 39, 43, 45

[56] References Cited
UNITED STATES PATENTS

| 2,574,171 | 11/1951 | Collins et al............................ 425/19 |
| 3,207,647 | 9/1965 | Schelkmann......................... 156/394 |
| 2,468,121 | 4/1949 | Shell..................................... 425/45 |

FOREIGN PATENTS OR APPLICATIONS

| 555,680 | 9/1943 | Great Britain....................... 156/96 |

Primary Examiner—Clifton B. Cosby
Attorney, Agent, or Firm—Parrott, Bell, Seltzer, Park & Gibson

[57] ABSTRACT

Methods and apparatus heretofore used in bonding previously cured tread material to a previously cured tire carcass are improved in a particular manner which facilitates the accommodation of varying sizes of tire carcasses within any given size of flexible, fluid impervious envelope. In accordance with this method and apparatus, such an envelope is arranged to lie outside flanges which extend along side wall portions of a mounted tire carcass and is sealed by exertion of a radially directed force on portions of the envelope, pressing the envelope portions into radially opening grooves provided on the flanges. For any given size of envelope, the location of such a seal may vary over a relatively greater range of positions than has been possible heretofore.

15 Claims, 12 Drawing Figures

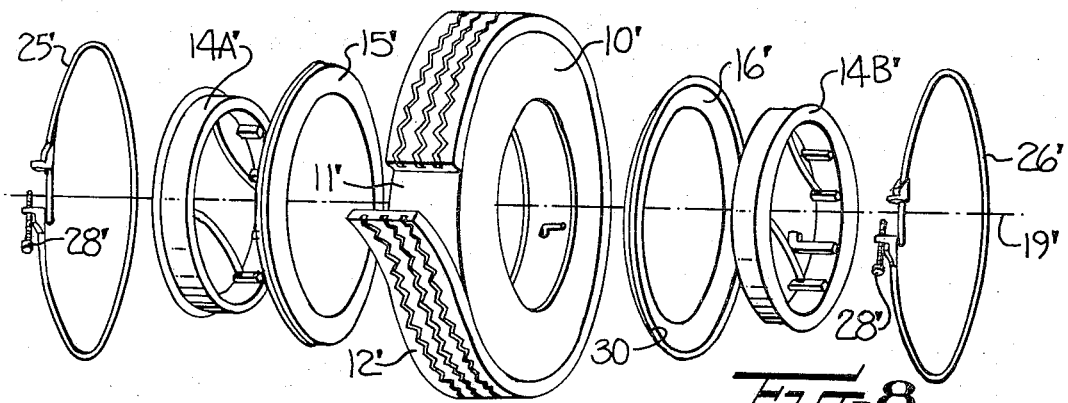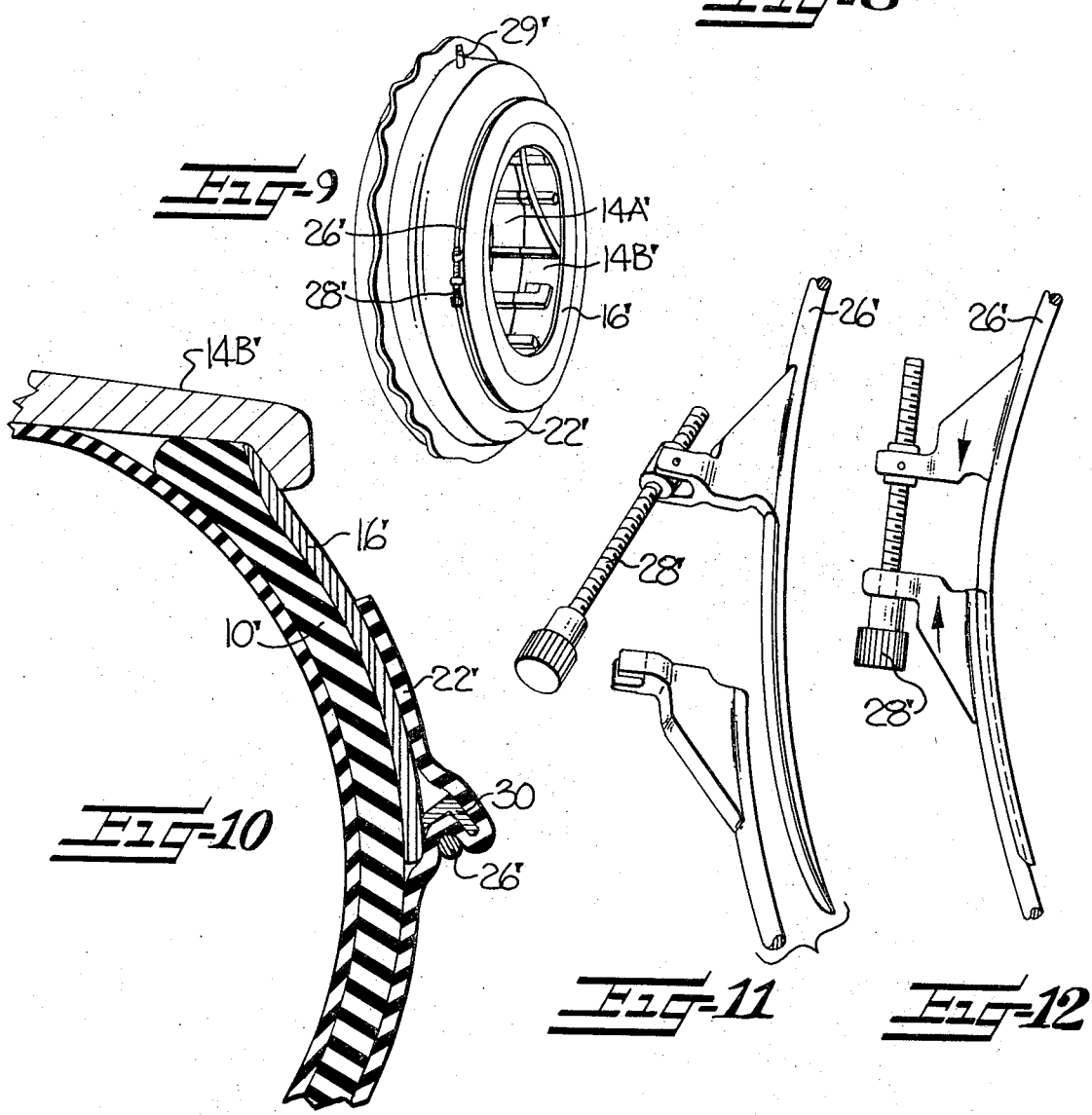

METHOD AND APPARATUS FOR TIRE TREAD BONDING

It has heretofore been proposed that a tread for a tire such as an automobile or truck tire may be provided by bonding previously cured tread material to a previously cured tire carcass. While disclosures of such methods and apparatus used in conjunction with the methods may be found in prior patents, certain systems which have been promoted to become of commercial significance rely upon flexible, fluid impervious envelopes and the imposition of pressure differences across the envelopes to retain tread material and a tire carcass in assembled relation during curing of a bonding material interposed between the tread material and carcass.

Heretofore, such flexible, fluid impervious envelopes have been employed in two particular methods. In each method, the tire carcass to which tread material is to be bonded is prepared by being buffed, if required, and coated with cement. Thereafter, a bonding layer of uncured rubber (which may or may not have particular desired vulcanizing characteristics) is positioned encircling the tire carcass and the previously cured tread material is positioned encircling the uncured rubber. The assembled tread material and carcass are then encircled or enclosed within the envelope.

In accordance with one method, the envelope substantially entirely encloses or wraps the assembled carcass and tread material, with the assembled carcass and tread material being free of any mounting rim or the like. The envelope extends across the full exterior surfaces of the tire carcass as well as the interior surfaces which are not exposed during normal use of the tire. By overlapping portions of the envelope one with another, a seal is accomplished which permits a differential in pressure across the envelope to press the envelope firmly against the tread material and the carcass during curing.

In accordance with another method, an envelope is provided which has a form similar to a torus slit on the innermost or least circumference. Such an envelope is positioned encircling the assembled carcass and tread material which are mounted on a rim having flanges which extend along side wall portions of the tire carcass. Inner radial margins of the envelope are interposed between the flanges and the side wall portions of the tire carcass, to accomplish sealing and permit a pressure differential across the envelope to press the envelope against the tread material and carcass and thereby retain the same in assembled relation.

Both of these prior methods suffer from deficiencies in that the range of tire carcass sizes which may be accommodated within any given size of envelope is severely restricted and, in many instances, is limited to a single size only. As a result, a shop operating in accordance with either of these prior methods is required to maintain a large inventory of envelopes in various sizes or to restrict the sizes of tires which will be accepted for working in accordance with the method being used.

It is an object of this invention to overcome the deficiencies and difficulties of prior methods and apparatus through facilitating the accommodation of varying sizes of tire carcasses within any given size of envelope used in a method otherwise generally similar to those of prior disclosures. In realizing this object of the present invention, a novel sealing arrangement for sealing an envelope to the flanges of a rim mounting a tire carcass is employed so that the particular location of sealing may vary over a range of positions.

In accordance with a further object of this invention, sealing of a flexible, fluid impervious envelope encircling an assembled carcass and tread material is accomplished by the exertion of a radially directed force on portions of the envelope so as to press the envelope portions into radially opening grooves on each side of the mounted tire carcass. In realizing this object of the present invention, the radially directed force may urge the envelope portions radially outwardly into a groove which opens radially inwardly or may, alternatively, press the envelope portions inwardly into an outwardly opening groove.

Yet another object of the present invention is to provide an improved arrangement for practicing methods such as those described hereinabove wherein means on the outside surfaces of flanges which extend along side wall portions of a mounted tire carcass define circular, radially opening grooves spaced intermediate the radial extent of the flanges, in further accommodation of varying sizes of tire carcasses within any given size of envelope. In realizing this object of the present invention, coordination of flange sets and envelopes may take into consideration the sizes of tires to be accommodated thereby in such a manner as to most economically and practically use the variation in sealing locations made possible by this invention.

Some of the objects and advantages of the invention having been stated, others will appear as the description proceeds, when taken in connection with the accompanying drawings, in which FIG. 1 is a diagramatic representation of a sequence of steps in practicing the method of the present invention;

FIG. 8 is a view similar to FIG. 2 illustrating a second embodiment of the present invention;

FIG. 9 is a view similar to FIG. 3 illustrating the embodiment of this invention shown in FIG. 8;

FIG. 10 is a view similar to FIG. 6, illustrating the sealing of an envelope in the arrangement of FIGS. 8 and 9;

FIG. 11 is a perspective view of a hoop member used in the arrangement of FIGS. 8-10; and FIG. 12 is a view similar to FIG. 7 of the hoop member of FIG. 11.

Figure 1:
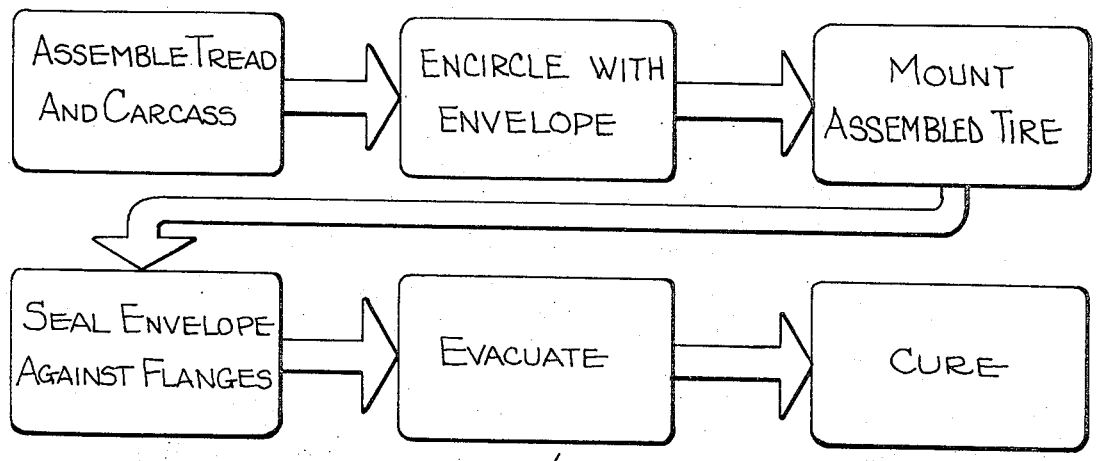
Figure 2:
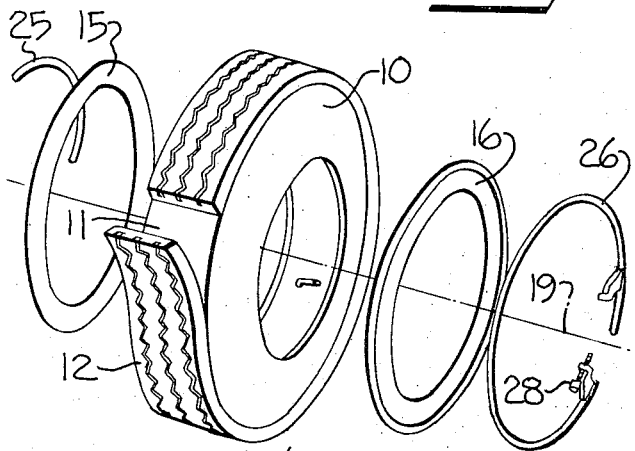
FIG. 2 is an exploded perspective view of a previously cured tire carcass, previously cured tread material and other components used in accordance with the present invention.
Figure 3:
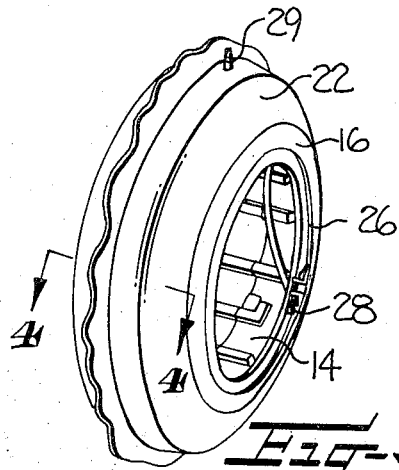
FIG. 3 is a perspective view similar to FIG. 2 showing a flexible, fluid impervious envelope arranged encircling the carcass and tread material of FIG. 2, in preparation for adhesion of the tread material to the carcass.

In the disclosure which follows, the method and apparatus of this invention will be described with particular reference to the embodiments illustrated in drawings. At the outset, however, it is to be understood that the illustrations and the description are to be taken as illustrative only of preferred embodiments for the method and apparatus of this invention and accordingly are to be understood in a general, rather than a restrictive, sense.

Generally, this invention is an improvement upon practices which have been disclosed heretofore and which are currently in use. For this reason, the description hereinafter will be directed particularly to the improvements contemplated as facilitating the accommodation of varying sizes of tire carcasses within any given size of envelope. The details of the preparation of a tire carcass for adhesion of a previously cured tread material thereto, the selection of the uncured rubber material to be used as a bonding layer, and the assembly of the tire carcass, bonding layer of uncured rubber and previously cured tread material will not be disclosed in detail. More specific information concerning those steps may, if required, be obtained from available prior patents.

In accordance with this invention, a tire carcass 10 which has been prepared and which has been encircled by a bonding layer 11 of uncured rubber and a length of previously cured tread material 12 is mounted upon a rim means generally indicated at 14. The assembled tire carcass 10 and tread material 12 remain mounted on the rim 14 during adhesion of the tread material 12 to the carcass 10 by curing of the bonding layer 11. The rim 14, in accordance with this invention, has flanges 15, 16 which extend along side wall portions of the mounted tire carcass 10. In the illustrated embodiment, the flanges 15, 16 are separable from the main body portion of the rim 14, as is typical of prior curing rim practice. It is to be understood, however, that the rims 15, 16 may be made integral with separable halves of the rim 14 or with a unitary rim 14 if such arrangements are practical or desired.

In accordance with an important feature of the present invention, each of the flanges 15, 16 has means thereon which defines a radially opening circular groove so that such a groove is provided on each side of the mounted tire carcass. In the first illustrated embodiment, the groove 18 formed in the flange 16 (FIGS. 4-6) opens radially inwardly, or has the open side thereof directed toward the central axis 19 of the rim 14 and flange 16. For purposes to be made more clear hereinafter, the flanges 15, 16 include tapering portions 20, 21 at the radial outer extremity thereof.

Figures 4, 5, 6:
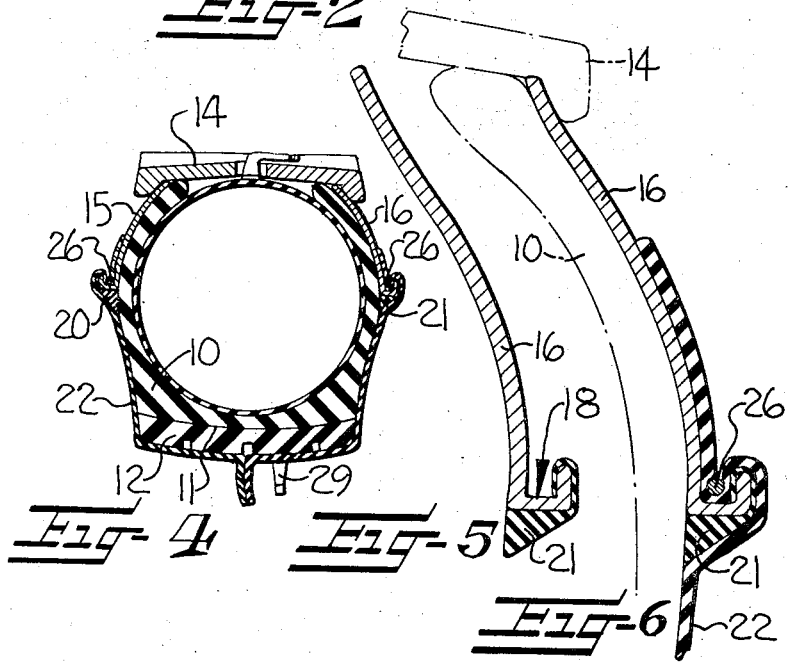
FIG. 4 is a section view taken along the line 4—4 in FIG. 3, through the assembled and encircled tire carcass of FIG. 3.
FIG. 5 is a section view taken along the line 5—5 of FIG. 2, through a portion of a rim used in FIGS. 2-4 and in accordance with the present invention.
FIG. 6 is a view similar to FIG. 5 illustrating an enlarged portion of the structure illustrated in FIG. 4.

Either before or after mounting of the assembled tire carcass 10 and tread material 12 on the rim 14, a flexible, fluid impervious envelope 22 is positioned encircling the tread material 12 and carcass 10. The envelope 22 preferably is formed of a suitable elastomeric material such as butyl and has a relaxed configuration similar to that of a hollow circle or torus slit on its innermost or least circumference. In accordance with this invention, the envelope is arranged to extend outside the flanges 15, 16 so as to interpose the flanges between the inner radial marginal portions of the envelope 22 and the side wall portions of the tire carcass (FIGS. 4 and 6).

In order to permit the presence of a pressure differential across the envelope 22, so as to press the tread material 12 against the carcass 10 and retain the same in assembled relation during adhesion of the tread material to the carcass, the envelope 22 is sealed to the flanges 15, 16 by exertion of a radially directed force on portions of the envelope which overlie the flanges 15, 16. By exertion of such a force, the inner radial marginal portions of the envelope 22 are pressed or urged into the radially opening grooves defined on each side of the mounted tire carcass (FIGS. 4 and 6).

Figure 7:
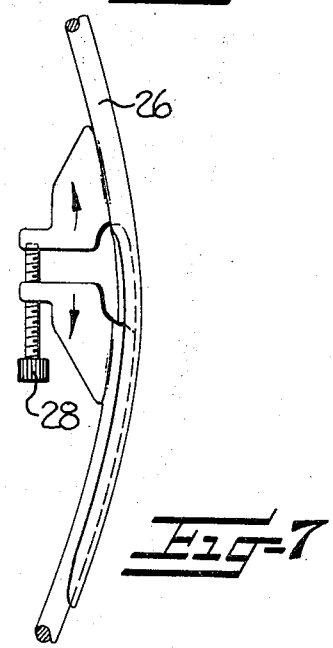
FIG. 7 is a plan view of a portion of a hoop member used in the arrangement of FIGS. 2-6.

In the first illustrated embodiment, the exertion of the radially outwardly directed force which presses the inner radial marginal portions of the envelope 22 into the inwardly opening groove is provided by a pair of hoop members 25, 26, each of variable circumference. The hoop members 25, 26 preferably are formed of metal rod such as steel rod and have circumferential end portions which may overlap in a sliding arrangement (FIG. 7). By means of a suitable hand screw 28 or the like, force may be exerted on the adjacent circumferential end portions of the hoop members to enlarge the circumference of the hoop members and thereby urge the hoop member toward a greater diameter.

Following sealing of the envelope 22 against the flanges 15, 16, in accordance with the methods of this invention, adhesion of the tread material 12 to the carcass 10 may proceed in accordance with the teachings of prior patents if desired. Concerning the development of a pressure differential across the envelope 22 so as to retain tread material in assembled relation, it is contemplated that this invention may include either the evacuation of the volume enclosed within the rim 14 and envelope 22, as by connecting a vacuum pump to a valve member 29 provided in the envelope 22, or by venting the volume through the valve 29 to atmospheric pressure during subjection of the assembly to elevated pressures and temperatures within a curing chamber. In either instance, inflation of the tire carcass 10 while mounted on the rim 14 may be employed if desired, with such inflation being to a predetermined initial pressure or in such a manner as to maintain a desired differential between curing chamber pressures and tire inflation pressures.

With the development of a differential pressure across the envelope 22, and pressing of the envelope against the assembled tire carcass 10 and tread material 12, the tapered portions 20, 21 provided at the outer radial terminus of the flanges 15, 16 reduce liklihood that the envelope 22 will be injured against a sharp rolled or machined edge of the respective flange. For this reason, it is desirable that the tapered portions 20, 21 be provided by cured elastomeric materials, although it is contemplated that they may be formed of metal or the like if so desired.

An alternative embodiment for the method and apparatus of this invention is illustrated in FIGS. 8-12, wherein similar structural elements have been identified by reference characters employed in FIGS. 1-7 with the addition of prime notation. The discussion which follows with particular reference to FIGS. 8-12 will be directed to emphasizing the distinction between the illustrated embodiments of this invention rather than repeating in full the disclosure given hereinabove.

In the arrangement of FIGS. 8-12, the flange means 15', 16' have mounted thereon a rolled angle or channel means 30 which defines a circular, radially outwardly opening, groove. The hoop members 26' are arranged to exert on the inner radial marginal portions of the envelope 22' a radially inwardly directed force, by reduction of the circumference of the hoop member. By this means, the envelope portions are pressed radially inwardly into the grooves provided.

In further comparison of the first and second embodiments of this invention, it will be noted that the rolled angle or channel member 30 may be arranged at varying points intermediate the radial extent of the flanges 15', 16' and that the radially inwardly directed groove provided on the flanges 15, 16 may be similarly relocated. Preferably, the location of sealing is spaced intermediate the radial extent or height of the flanges, in order to provide the type of fairing or smoothing protection for the envelopes 22, 22' accomplished by the tapering portions 20, 21 described hereinabove and to cooperate with the envelopes in accommodation of varying sizes of tire carcasses. Particularly as to the latter feature of this invention, it will be understood that envelopes of any given size may be sealed against flanges in accordance with the method of this invention and through the use of the arrangement of this invention at any point along the inner radial marginal portions thereof. Any excessive length of envelope present when the envelope is positioned encircling a particular tire size simply lies along the flanges, extending radially inwardly of location of sealing (FIGS. 6 and 10). By coordination of the sealing locations and fully utilizing the available radial extent of the envelopes, the numbers of different sizes of rims and envelopes which are required to accommodate a full range of tire sizes is significantly reduced. Thus, economies in manufacture and investment can be realized.

In the drawings and specification, there has been set forth a preferred embodiment of the invention, and although specific terms are employed, they are used in a generic and descriptive sense only and not for purposes of limitation.

That which is claimed is:

1. In a method of bonding previously cured tread material to a previously cured tire carcass which includes encircling the tire carcass with a bonding layer of uncured vulcanizable rubber, encircling the uncured rubber with the tread material, encircling the assembled carcass and tread material with a flexible, fluid impervious envelope and adhering the tread material to the carcass by heating the assembled carcass and tread material and curing the interposed rubber while retaining the tread material and carcass in assembled relation with the envelope, an improvement which facilitates accommodation of varying sizes of tire carcasses within any given size of envelope, said improvement comprising the steps of:

mounting the tire carcass on a rim while assembling with the rim and tire carcass flanges which are resiliently held between the rim edges and the tire carcass bead and extend an appreciable distance up and along side wall portions of the tire carcass and define radially opening grooves on each side and medially of the side wall of the mounted tire carcass, arranging the envelope to extend outside the flanges so as to interpose the flanges between the envelope and the side wall portions of the tire carcass, and sealing the envelope to the flanges and securing the envelope about the crown of the tire carcass by exerting a radially directed force on portions of the envelope overlying the flanges and pressing the envelope portions into the radially opening grooves.

2. A method according to claim 1 wherein the step of sealing the envelope comprises pressing the envelope portions radially outwardly and into radially inwardly opening grooves.

3. A method according to claim 1 wherein the step of sealing the envelope comprises pressing the envelope portions radially inwardly and into radially outwardly opening grooves.

4. A method according to claim 1 further comprising the step of evacuating the volume enclosed within the envelope and rim so as to press the envelope against the assembled tread material and carcass.

5. A method according to claim 1 wherein the step of adhering the tread material to the carcass while retaining the tread material and carcass in assembled relation comprises inflating the tire carcass, placing the inflated tire carcass and sealed envelope within a curing chamber, elevating the temperature and pressure within the chamber, and pressing the envelope against the tread material and inflated tire carcass by the pressure differential thereacross.

6. In a method of bonding previously cured tread material to a previously cured tire carcass which includes encircling the tire carcass with a bonding layer of uncured vulcanizable rubber, encircling the uncured rubber with the tread material, encircling the assembled carcass and tread material with a flexible, fluid impervious envelope and adhering the tread material to the carcass by heating the assembled carcass and tread material and curing the interposed rubber while retaining the tread material and carcass in assembled relation with the envelope, an improvement which facilitates accommodation of varying sizes of tire carcasses within any given size of envelope, said improvement comprising the steps of:

mounting the tire carcass on a rim while assembling with the rim and tire carcass flanges which are resiliently held between the rim edges and the tire carcass bead and extend an appreciable distance up and along side wall portions of the tire carcass and define radially inwardly opening grooves on each side and medially of the side wall of the mounted tire carcass, arranging the envelope to extend outside the flanges so as to interpose the flanges between the envelope and the side wall portions of the tire carcass, and sealing the envelope to the flanges and securing the envelope about the crown of the tire carcass by exerting a radially outwardly directed force on portions of the envelope overlying the flanges and pressing the envelope portions into the radially inwardly opening grooves.

7. A method according to claim 6 wherein the step of sealing the envelope comprises the steps of engaging the envelope portions with generally circular hoop members of adjustable circumference while entrapping the envelope portions between the hoop members and the flanges, and then enlarging the circumference of the hoop members so as to press the envelope portions radially outwardly.

8. In a method of bonding previously cured tread material to a previously cured tire carcass which includes encircling the tire carcass with a bonding layer of uncured vulcanizable rubber, encircling the uncured rubber with the tread material, encircling the assembled carcass and tread material with a flexible, fluid impervious envelope and adhering the tread material to the carcass by heating the assembled carcass and tread material and curing the interposed rubber while retaining the tread material and carcass in assembled relation with the envelope, an improvement which facilitates accommodation of varying sizes of tire carcasses within any given size of envelope, said improvement comprising the steps of:

mounting the tire carcass on a rim while assembling with the rim and tire carcass flanges which are resiliently held between the rim edges and the tire carcass bead and extend an appreciable distance up and along side wall portions of the tire carcass and define radially outwardly opening grooves on each side and medially of the side wall of the mounted tire carcass, arranging the envelope to extend outside the flanges so as to interpose the flanges between the envelope and the side wall portions of the tire carcass, and sealing the envelope to the flanges and securing the envelope about the crown of the tire carcass by exerting a radially inwardly directed force on portions of the envelope overlying the flanges and pressing the envelope portions into the radially outwardly opening grooves.

9. A method according to claim 8 wherein the step of sealing the envelope comprises the steps of engaging the envelope portions with generally circular hoop members of adjustable circumference while entrapping the envelope portions between the hoop members and the flanges, and then reducing the circumference of the hoop members so as to press the envelope portions radially inwardly.

10. In an arrangement for bonding previously cured tread material to a previously cured tire carcass wherein a tire carcass encircled by a bonding layer of vulcanizable uncured rubber and the tread material is encircled by a flexible, fluid impervious envelope means for retaining the tread material and carcass in assembled relation during adhesion of the tread material to the carcass by heating the assembled carcass and tread material and curing of the interposed rubber, an improvement which facilitates accommodation of varying sizes of tire carcasses within any given size of envelope, said improvement comprising:

rim means for mounting a tire carcass during adhesion of tread material thereto, flange means for assembly with said rim means, for being resiliently held between the bead of a mounted tire carcass and an edge of said rim means and for extending an appreciable distance up and along side wall portions of the tire carcass, means on said flange means for defining a radially opening groove medially and outwardly of each side wall of the tire carcass, and sealing means for exerting on portions of an envelope which overlie said flange means radially directed forces pressing the envelope into said radially opening grooves.

11. Apparatus according to claim 10 wherein said flange means extend radially outwardly along and in engagement with the side wall portions of a mounted tire carcass for a predetermined radial distance from the bead portions thereof and further wherein said groove defining means is mounted on said flange means intermediate the radial extent thereof.

12. Apparatus according to claim 10 wherein said groove defining means forms a radially inwardly opening groove and further comprising fairing means for providing a tapering surface adjacent the outer radial circumference of said flange means and thereby facilitating reduction in concentration of stress in the envelope.

13. Apparatus according to claim 10 wherein said groove defining means comprises a circular channel member fixed to said flange means at a predetermined location concentric with said rim means and spaced intermediate the radial extent of said flange means, said channel member defining a circular radially outwardly opening groove.

14. Apparatus according to claim 10 wherein said sealing means comprises a pair of hoop members each having an adjustable circumference, said hoop members cooperating with said flange means for entrapping said envelope portions between said flange means and said hoop member and cooperating with said groove defining means for pressing said entrapped envelope portions thereinto.

15. In an arrangement for bonding previously cured tread material to a previously cured tire carcass wherein flexible, tire carcass encircled by a bonding layer of uncured vulcanizable rubber and the tread material is encircled by a fhexible, fluid impervious envelope means for retaining the tread material and carcass in assembled relation during adhesion of the tread material to the carcass by heating the assembled carcass and tread material and curing of the interposed rubber, an improvement which facilitates accommodation of varying sizes of tire carcasses within any given size of envelope, said improvement comprising:

rim means for mounting a tire carcass during adhesion of tread material thereto, flange means for assembly with said rim means, for being resiliently held between the bead of a mounted tire carcass and an edge of said rim means and for extending an appreciable distance up and a predetermined radial distance along side wall portions of the tire carcass and interior surfaces of said flange means engaging the spaced exterior side wall portions of the tire carcass, means on the exterior surfaces of said flange means for defining circular, radially opening grooves spaced intermediate the radial extent of said flange means, and first and second hoop members each cooperating with a corresponding one groove for entrapping an inner radial margin portion of the envelope between said flange means and said hoop member and for pressing the entrapped envelope into said groove so as to seal the envelope about the tire carcass.

* * * * *

UNITED STATES PATENT OFFICE
CERTIFICATE OF CORRECTION

Patent No. 3,802,978          Dated April 9, 1974

Inventor(s)   Ernest Eugene Barnett

It is certified that error appears in the above-identified patent and that said Letters Patent are hereby corrected as shown below:

Column 8, line 32, omit "flexible" and insert therefor --a--

Column 8, line 34, correct the spelling of "flexible"

Signed and sealed this 30th day of July 1974.

(SEAL)
Attest:

McCOY M. GIBSON, JR.                C. MARSHALL DANN
Attesting Officer                   Commissioner of Patents